Aug. 6, 1940.                     W. V. JOHNSON                      2,210,669
                                  TIME ELEMENT RELAY
                                  Filed April 10, 1937
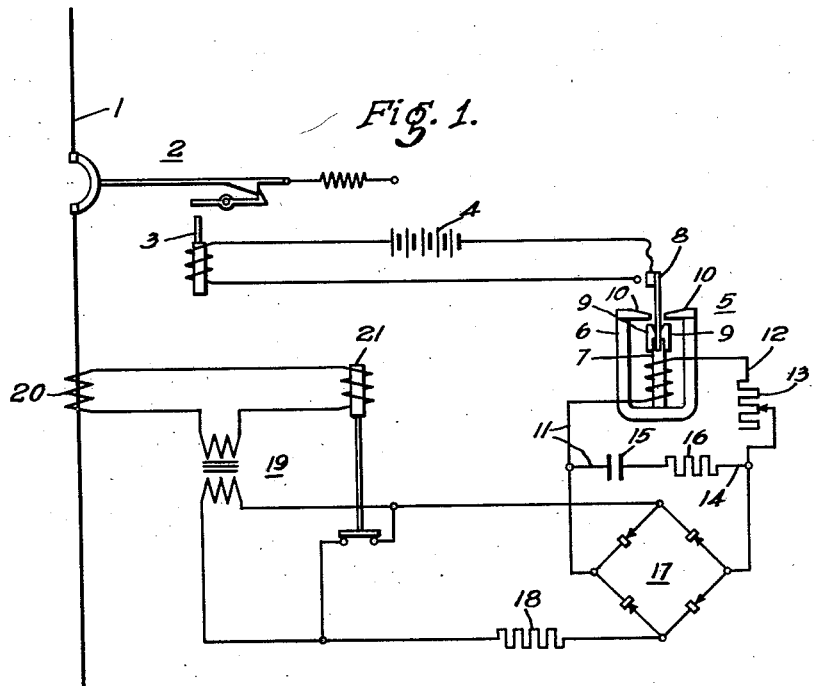
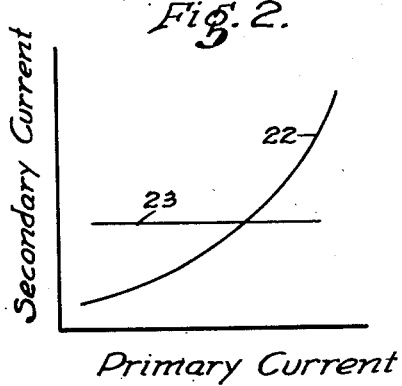
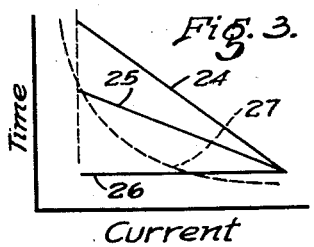
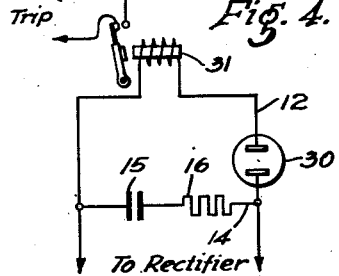
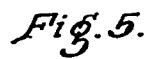
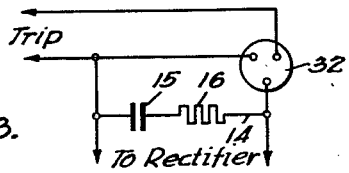
WITNESSES:                                                    INVENTOR
                                                           Welton V. Johnson.
                                                           BY
                                                                ATTORNEY Patented Aug. 6, 1940

2,210,669

UNITED STATES PATENT OFFICE 2,210,669

TIME-ELEMENT RELAY

Welton V. Johnson, East Orange, N. J., assignor to Westinghouse Electric & Manufacturing Company, East Pittsburgh, Pa., a corporation of Pennsylvania Application April 10, 1937, Serial No. 136,153

7 Claims. (Cl. 175—294)

My invention relates to protective apparatus for alternating-current transmission and distribution systems, and particularly to protective relays which operate with variable time delay dependent upon the magnitude of current flow in the faulted line. In its more specific aspects, my invention relates to overcurrent relays having time-current characteristics of broad range or substantially straight-line form, such as disclosed in my copending application, Serial No. 85,634, filed June 11, 1936, and assigned to Westinghouse Electric & Manufacturing Company.

A number of broad range or straight-line overcurrent relays have heretofore been proposed, but so far as I am aware, all such prior relays have required a rather complicated relay stucture having some form of mechanical timing device, such as an eddy current brake or a timing motor.

It is an object of my invention to provide a novel broad range overcurrent relay having a relatively simple magnetic structure and having an electrical timing device external to the magnetic structure itself.

Another object of my invention is to provide a novel broad range overcurrent relay which will operate at comparatively high speed with comparatively small burden on the current transformer from which the relay is energized.

Other objects of my invention will become evident from the following detailed description, taken in conjunction with the accompanying drawing, in which:

Figure 1 is a diagrammatic view of an overcurrent relay and associated apparatus embodying my invention;

Fig. 2 is a diagrammatic view in coordinates showing the relationship of secondary current and primary current in a current transformer used in the practice of my invention;

Fig. 3 is a diagram in coordinates showing the time-current characteristics of my improved relay;

Fig. 4 is a diagrammatic view of a modification of the apparatus shown in Fig. 1; and Fig. 5 is a diagrammatic view of a further modification.

Referring to Figure 1 in detail, an alternating-current power circuit 1, which may be a transmission or distribution feeder, is controlled by means of a circuit breaker 2 of any suitable type, having a battery operated trip device 3.

The trip device 3 is connected in circuit with a storage battery 4 and is arranged to be controlled by a sensitive polarized direct-current relay 5, preferably of the type disclosed in my prior United States Patent No. 2,036,277, granted April 7, 1936, and assigned to the Westinghouse Electric & Manufacturing Company.

The polarized relay 5 comprises a U-shaped permanent magnet 6, to which is fastened a pair of pole pieces 10 of soft iron or other suitable magnetic material. A core 7 is centrally located within the magnet 6, and is slotted to receive a reed 8 of magnetic material, arranged to lie in a normal position midway between the surfaces of the pole pieces 10. A pair of cams 9 are secured to the core member 7 by any suitable means (not shown) in position to bear against the magnetic reed 8.

The cams 9 are designed to vary the tension of the magnetic reed, with movement of the latter from its central position in such manner as to overcome the unstable action of the magnetic reed 8 in being attracted to one or the other of the pole pieces 10. With the cams 9 carefully ground to the required form, the reed 8 may be maintained in a substantially critical condition of stability throughout its entire range of movement. With such a construction, operation of the relay contacts may be affected with only a few microwatts of electrical power supplied to the relay winding.

The energizing winding of the relay 5 is connected in a divided rectifier current circuit 11, having a first branch 12 and a second branch 14, which are designed to provide a time delay in the operation of the relay 5. The desired time delay may be secured in various ways, as by making the time constants of the branches 12 and 14 different, or by delaying the building up of voltage applied to the branch 12. In the preferred arrangement, the first branch 12 draws a negligibly small current as compared to the second branch 14, and the relay 5 responds substantially to voltage. A capacitor 15 and a resistor 16 are included in the second branch 14 to provide a time delay in the building up of voltage applied to the relay 5, and an adjustable resistor 13 is included in series with the coil of relay 5 to provide a voltage adjustment. Various other expedients may be utilized to delay operation of relay 5, as will be pointed out in connection with Figs. 4 and 5.

The rectified current circuit 11 is connected to the secondary circuit of a suitable auxiliary transformer 19, in series with a resistor 18, by means of a suitable rectifier 17.

The auxiliary transformer 19 is energized from the power circuit 1 by means of an insulating current transformer 20. A starting element 21 is included in the secondary circuit of the insulating transformer 20, and is arranged to maintain the primary winding of the auxiliary current transformer 19 short circuited during normal conditions of the power circuit 1.

The resistor 18 serves to give the secondary circuit of the auxiliary transformer 19 a drooping volt-ampere characteristic, so as to accentuate the constant-current characteristics of the latter circuit. Preferably, the resistor 18 has sufficient resistance to consume several times the voltage consumed by the divided circuit 11, so that voltage changes in the latter circuit during charging of the condenser 15 have no material effect upon the charging rate.

The auxiliary transformer 19 is preferably of special design having a modified core structure such as to provide a relationship of secondary current to primary current illustrated by the curve 22 of Fig. 2. In some cases, where definite time characteristics are necessary, the auxiliary current transformer 19 may have a modified core structure such as to provide the characteristic shown at 23 in Fig. 2. As the specific transformer structure forms no part of the present invention, detailed description and illustration thereof have been omitted.

The operation of the apparatus shown in Fig. 1 may be set forth as follows: During normal conditions of the power circuit 1, the starting relay element 21 is insufficiently energized to open its contacts, and the auxiliary transformer 19 and relay 5 remain deenergized.

In the event that a fault occurs on the power circuit 1, the fault current rises to short circuit magnitudes and the starting element 21 opens to energize the auxiliary transformer 19 from the insulating transformer 20. Rectified current is accordingly supplied by means of the rectifier 17 to the divided rectified-current circuit 11.

At the first instant following operation of the starting element 21, the capacitor 15 is completely deenergized and no back E. M. F. is present across the terminals of the capacitor. The second branch 14 of the rectified-current circuit accordingly draws a comparatively heavy current, thereby shunting a component of current away from the energizing winding of the polarized relay 5.

As current continues to flow in the branch 14, a charge accumulates on the capacitor 15, and the voltage applied to the branch 12 increases progressively with time. At the expiration of a variable time delay dependent upon the magnitude of line current, the voltage applied to the branch 12 of the divided rectified-current circuit reaches a sufficient value to effect operation of the polarized relay 5.

Upon operation of the polarized relay 5, the trip device 3 is energized from the battery 4, thereby causing the circuit breaker 2 to open.

By properly choosing the constants of the capacitor 15, resistor 16 and resistor 13 with reference to the characteristics of the relay 5 and the auxiliary transformer 19, the overall characteristics of the relay may be made of substantially straight-line form, as shown at 24 in Fig. 3. By adjusting the value of resistor 13 included in the circuit 12, the time-current characteristic of the relay may be shifted, as indicated by the curve 25 of Fig. 3. The curve 26 of Fig. 3 shows a definite time characteristic, which may be secured with an auxiliary transformer 19, having the characteristic shown at 23 of Fig. 2. A hyperbolic characteristic, such as obtained with the usual forms of inverse-time overcurrent relays, is indicated at 27.

Fig. 4 shows a modified circuit in which a two-element tube 30, of the type known as a break-over lightning-arrester tube, is used to prevent energization of the relay 31 until the voltage across the condenser 15 attains a predetermined value. In this modification, the relay 31 may be of the well-known clapper type.

Fig. 5 shows a further modification in which a three-element tube 32, of the type known as a three-ball lightning-arrester tube, is utilized, and the electromagnetic relay is omitted. In this modification, the tube 32 breaks down when the voltage across the condenser 15 attains a predetermined value, and upon ionization of the gas in the tube 32, the trip circuit is completed.

It will be understood that any suitable two-element or three-element gas-filled tubes may be substituted for the lightning-arrester tubes 30 or 32, respectively.

I do not intend that the present invention shall be restricted to the specific structural details and arrangement of parts, of circuit connections herein set forth, as various modifications thereof may be effected without departing from the spirit and scope of my invention. I desire, therefore, that only such limitations shall be imposed as are indicated in the appended claims.

I claim as my invention:

1. In a relay system responsive to an abnormal condition of an alternating-current power circuit; an electromagnetic relay element responsive to a uni-directional electrical condition, said relay having an energizing winding; a divided rectified-current circuit having a first branch including said energizing winding, and having a second branch, capacitive means in said second branch for controlling the flow of current to said energizing winding as a function of time; resistance means in said second branch for limiting the flow of current to said capacitive means; and transforming and rectifying means connecting said divided rectified-current circuit to said power circuit for energization to a degree dependent upon a predetermined variable thereof, said last named means including a current transformer proportioned to produce an operating time for said relay having a straight-line relationship relative to the magnitude of said predetermined variable.

2. In a relay system responsive to an abnormal condition of an alternating-current power circuit; an electromagnetic relay element responsive to a uni-directional electrical condition, said relay element having an energizing winding; a divided rectified-current circuit having a first branch including said energizing winding and having a second branch; capacitive impedance means included in said divided rectified-current circuit for controlling the flow of rectified current to said energizing winding as a function of time; a current transformer energized from said power circuit, said transformer including a secondary circuit and having characteristics such as to provide a substantially non-linear relationship of secondary current to primary current; and a rectifier connecting said divided rectified-current circuit to said secondary circuit for energization to a degree dependent on line current.

3. In a relay system responsive to an abnormal condition of an alternating-current power circuit; an electromagnetic relay element having an energizing winding responsive to direct current; a capacitor; a resistor; a divided rectified-current circuit having a first branch including said energizing winding and having a second branch including said capacitor and said resistor; a current transformer energized from said power circuit, said current transformer including a secondary circuit and having characteristics such as to provide a substantially non-linear relationship of seondary current to primary current; and a rectifier connecting said divided rectified-current circuit to said secondary circuit for energization to a degree dependent upon line current.

4. In a relay system responsive to an abnormal condition of an alternating-current power circuit, an electro-responsive circuit-closing device effective upon uni-directional energization to a predetermined degree; a divided rectified-current circuit having a first branch including said electro-responsive device and having a second branch; capacitive impedance means included in said divided rectified-current circuit for controlling the energization of said electro-responsive device as a function of time; a current transformer energized from said power circuit, said transfer including a secondary circuit and having characteristics such as to provide a substantially non-linear relationship of secondary current to primary current; and a rectifier connecting said divided rectified-current circuit to said secondary circuit for energization to a degree dependent on line current.

5. In a relay system responsive to an abnormal condition of an alternating-current power-circuit; an electromagnetic relay element responsive to a uni-directional electrical condition, said relay having an energizing winding; a divided rectified-current circuit having a first branch including said energizing winding, and having a second branch; resistance means in said first branch for controlling the flow of current to said energizing coil; capacitive means in one of said branches for controlling the flow of rectified current to said energizing means as a function of time; and transforming and rectifying means connecting said divided rectified current circuit to said power circuit for energization to a degree dependent upon a predetermined variable thereof, said last named means including a current transformer proportioned to produce an operating time for said relay having a straight-line relationship relative to the magnitude of said predetermined variable.

6. In a relay system responsive to an abnormal condition of an alternating-current power-circuit; an electromagnetic relay element responsive to a uni-directional electrical condition, said relay having an energizing winding; a divided rectified-current circuit having a first branch including said energizing winding, and having a second branch; resistance means in said first branch for controlling the flow of current to said energizing coil; capacitive means in said second branch for controlling the flow of rectified current to said energizing means as a function of time; and resistance means in said second branch for limiting the flow of current to said second impedance means; and transforming and rectifying means connecting said divided rectified-current circuit to said power circuit for energization to a degree dependent upon a predetermined variable thereof, said last named means including a current transformer proportioned to produce an operating time for said relay having a straight-line relationship relative to the magnitude of said predetermined variable.

7. In a relay system, a relay, a relay actuating circuit, a rectifier for supplying direct current to said circuit, capacitive means in parallel with said relay actuating circuit for varying the time response of said relay in accordance with the charging rate of said capacitive means, and an alternating current power source for said rectifier having a resistance sufficient to produce a voltage drop several times the drop across said circuit whereby fluctuations in voltage in said circuit have no material effect on the charging rate.

WELTON V. JOHNSON.